United States Patent
Nayak et al.

(10) Patent No.: US 10,866,144 B2
(45) Date of Patent: Dec. 15, 2020

(54) BRANCH CIRCUIT THERMAL MONITORING SYSTEM FOR CONTINUOUS TEMPERATURE MONITORING BY DIRECTLY APPLIED SENSORS

(71) Applicant: Siemens Industry, Inc., Alpharetta, GA (US)

(72) Inventors: Amit Nayak, Atlanta, GA (US); Matthew Leidy, Norcross, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 278 days.

(21) Appl. No.: 16/111,602

(22) Filed: Aug. 24, 2018

(65) Prior Publication Data

US 2020/0064201 A1 Feb. 27, 2020

(51) Int. Cl.
*G01K 13/00* (2006.01)
*G01K 1/02* (2006.01)
*G01K 3/00* (2006.01)

(52) U.S. Cl.
CPC ............. *G01K 1/026* (2013.01); *G01K 1/024* (2013.01); *G01K 3/005* (2013.01)

(58) Field of Classification Search
CPC ........ G01K 1/024; G01K 1/026; G01K 3/005; G01R 19/2513; G01R 19/2516;
(Continued)

(56) References Cited

U.S. PATENT DOCUMENTS

RE36,310 E * 9/1999 Bjerrum ............... G06Q 20/341
380/278

5,966,304 A * 10/1999 Cook ....................... G05B 9/03
700/2
(Continued)

FOREIGN PATENT DOCUMENTS

| CN | 106160223 A | * | 11/2016 |
| KR | 100357982 B1 | * | 10/2002 |
| KR | 20160067415 A | * | 6/2016 |

OTHER PUBLICATIONS

Unkwon; "MTL4675 Temperature Converter"; Eaton Electric Ltd; https://www.mtlinst.com/images/uploads/datasheets/MTL4675.pdf and https://www.mtlinst.com/product/mt14600_range]; 2016.
(Continued)

*Primary Examiner* — Gail Kaplan Verbitsky (57) ABSTRACT

A branch circuit thermal monitoring system comprises a housing and an electrical power distribution sub-system. The housing includes a plurality of thermal modules each connected with a thermal sensor assembly of a plurality of thermal sensor assemblies. The housing further includes a module rack wherein each of the thermal modules is installed on the module rack. The housing further includes a main controller configured to communicate with the thermal modules. The thermal modules are configured for individually monitoring corresponding identified connection points of interest with the attached thermal sensor assemblies such that the thermal modules and the thermal sensor assemblies provide continuous temperature monitoring of the corresponding identified connection points of interest. The thermal sensor assembly is configured to be directly applied to a connection point of interest thus avoiding any additional mounting assembly. The electrical power distribution sub-system is coupled to the thermal modules.

21 Claims, 3 Drawing Sheets

(58) Field of Classification Search
CPC .............. G05B 19/0428; G05B 19/054; G05B 2219/13144; G05B 2219/15038; G05B 2219/34445; H05K 7/1481; G01S 19/13; G01B 19/054; F24F 11/58; G06F 1/12
USPC .......................... 374/137, 32, 112; 709/201
See application file for complete search history.

(56) References Cited

U.S. PATENT DOCUMENTS

| | | | | |
|---|---|---|---|---|
| 6,148,292 | A * | 11/2000 | Reisinger | G07B 17/0008 705/30 |
| 7,173,821 | B2 * | 2/2007 | Coglitore | H05K 7/1492 361/695 |
| 7,461,273 | B2 * | 12/2008 | Moore | G06F 1/3203 713/300 |
| 7,495,876 | B2 | 2/2009 | Dunne et al. | |
| 7,989,769 | B2 | 8/2011 | Brandt et al. | |
| 8,310,370 | B1 | 11/2012 | Williams et al. | |
| 8,576,082 | B2 | 11/2013 | Jones | |
| 10,058,013 | B2 * | 8/2018 | Schmitt | H05K 7/20836 |
| 10,156,987 | B1 * | 12/2018 | Gutierrez | G06F 1/3268 |
| 10,694,644 | B2 * | 6/2020 | Campbell | H05K 7/20709 |
| 2013/0032310 | A1 * | 2/2013 | Jaena | H05K 7/20681 165/104.25 |
| 2013/0100609 | A1 * | 4/2013 | Wang | G05D 23/1931 361/688 |
| 2013/0320984 | A1 * | 12/2013 | Lagmanson | G01V 3/02 324/334 |
| 2014/0006610 | A1 * | 1/2014 | Formby | H04L 43/106 709/224 |
| 2014/0013048 | A1 * | 1/2014 | Biederman | G06F 3/0689 711/114 |
| 2014/0082142 | A1 * | 3/2014 | Geffin | G06F 13/385 709/217 |
| 2015/0256409 | A1 * | 9/2015 | Masuyama | H04L 41/12 370/254 |
| 2017/0089763 | A1 | 3/2017 | Freer et al. | |
| 2017/0325007 | A1 * | 11/2017 | Snibbe | H04N 21/2353 |
| 2017/0372578 | A1 * | 12/2017 | Klein | H05K 7/1492 |
| 2018/0367291 | A1 * | 12/2018 | Lecourtier | H04J 3/0638 |
| 2019/0025894 | A1 * | 1/2019 | Best | H05K 7/1492 |
| 2019/0208660 | A1 * | 7/2019 | Agrawal | H05K 7/1498 |

OTHER PUBLICATIONS

Unkonwn; "MTL4500/4600 range Isolating interface units"; Instruction Manual; Eaton; https://www.mtlinst.com/images/uploads/datasheets/rNM4500_4600.pdf and https://www.mtl-inst.com/product/mtl4600_range] See section 4—backplane installation, and 6.7.2 MTL4575—Temperature Converter; Mar. 2018.

* cited by examiner

BRANCH CIRCUIT THERMAL MONITORING SYSTEM FOR CONTINUOUS TEMPERATURE MONITORING BY DIRECTLY APPLIED SENSORS

BACKGROUND

1. Field

Aspects of the present invention generally relate to a branch circuit thermal monitoring system for continuous temperature monitoring by modules with a thermal sensor assembly applied directly to a connection point of interest thus avoiding any additional mounting assembly.

2. Description of the Related Art

Overheating of electrical connection elements in electrical power distribution systems can cause catastrophic dangerous situations. To prevent such occurrences customers/end users of electrical power distribution system need to deploy monitoring of temperature rise in connection elements such as joints, lugs, cables in panel boards, switchboards, switchgear, bus way systems etc. Customers need to be notified within reasonable time of the rise in temperature with respect to any variations relative to established normal operating conditions.

Typical thermal monitoring and measurement systems within electrical power distribution system are performed using externally installed thermal imaging equipments or thermal data gathering devices or integrated electronics within the components inside the system. The imaging technology involves for example, allowing for infra-red view ports (one such example is Fluke IR windows) specially designed on a power distribution system's external cover. An attendant or a technician can use a hand-held scanner directed at the view port to periodically or on ad hoc basis gauge the thermal condition of the components inside the system. The view port is directed towards the interested connection elements. Typically installing infra-red view port designed for an electrical distribution system is expensive. The technician or attendant assigned to record the temperature rise of the connection element can record the information at a specific or predetermined time interval and the behavior of the temperature within the system is not available between the time-period of the recordings. Further the view ports are intended to allow the assessment of fixed points of interest and cannot be used to identify the conditions of elements which are not in the line of sight from the view port.

Alternately, the infra-red scanning can be moved closer to the measurement points of interest and the resultant reading signal is provided to a central processing unit. Further products available can use fiber optic technology to provide temperature data to the central processing unit. The central processing unit can relay the temperature data to end user on a predetermined rate or on demand. In case of the dedicated infra-red scanning of the connected element, each infra-red scanner device monitoring a single connection point has to be mounted in a separate assembly within the confines of the power distribution system. Further the information from the infra-red scanner is reliable only with the precise scanning of the connected point. The fiber optic technology while easily installable to the interested junction is an expensive technology.

Another method of capturing temperature rise is through the use of specially designed wireless transmitters with sensors designed to be attached to the interested points. The wireless transmitter integrated with sensors such as a Wireless Temperature Monitoring System comprises of sensors that are in direct contact with the surface of the connection element. These sensors require battery for the operations which have a limited life time before needing replacement. Further the sensors may require calibration according to the application prior to providing temperature readings. Access to the installation area for replacement of batteries or additional calibration introduces downtime of the electrical power distribution system. This also exposes the installer or commissioning agent to hazardous conditions potentially caused by arc flash events when accessing the power distribution system.

The need for battery is alleviated by another type of wireless transducers called surface acoustic wave type sensors. These sensors can be mounted directly to the electrical connection points and be periodically actuated by external readers through radio frequency signals. The surface acoustic wave sensors when activated can send back a modified version of the radio frequency signal which contains the temperature information of the attached electrical connection point. However, the surface acoustic wave technology is also expensive for installation to the end user.

Therefore, there is a current need for cost effective temperature monitoring at an electrical connection point of interest such as joints, lugs, cables in panel boards, switchboards, switchgear, bus way systems etc. in an electrical power distribution system.

SUMMARY

Briefly described, aspects of the present invention relate to an electrical power distribution system that provides cost effective continuous monitoring of temperature rise in connection elements such as joints, lugs, cables in panel boards, switchboards, switchgear, bus way systems etc. Customers are notified within reasonable time of the rise in temperature with respect to any variations relative to established normal operating conditions. In this way, overheating of electrical connection elements in electrical power distribution systems may not cause catastrophic dangerous situations. A branch circuit thermal monitoring system is designed to provide resolution to these challenges. The solution is designed to be relatively modular and be adaptable to be retrofitted to existing power distribution systems. The solution is also designed to not impede on the operation of the power distribution functionality while it communicates the temperature rise information. Continuous temperature monitoring by modules with a thermal sensor assembly applied directly to a connection point of interest is provided thus avoiding any additional mounting assembly.

In accordance with one illustrative embodiment of the present invention, a branch circuit thermal monitoring system is provided. It comprises a housing including: a plurality of thermal modules each connected with a thermal sensor assembly of a plurality of thermal sensor assemblies, a module rack that is expandable and a main controller configured to communicate with the plurality of thermal modules. Each of the thermal modules of the plurality of thermal modules are installed on the module rack. The plurality of thermal modules are configured for individually monitoring corresponding identified connection points of interest with the attached plurality of thermal sensor assemblies such that the plurality of thermal modules and the plurality of thermal sensor assemblies provide continuous temperature monitoring of the corresponding identified connection points of interest. The thermal sensor assembly is configured to be directly applied to a connection point of interest of the corresponding identified connection points of interest thus avoiding any additional mounting assembly. The branch circuit thermal monitoring system further comprises an electrical power distribution sub-system coupled to the each thermal module of the plurality of thermal modules.

DETAILED DESCRIPTION

To facilitate an understanding of embodiments, principles, and features of the present invention, they are explained hereinafter with reference to implementation in illustrative embodiments. In particular, they are described in the context of a branch circuit thermal monitoring system for continuous temperature monitoring by directly applied sensors. The system may comprise module racks having different sensing mechanisms. The system may controllably manage placement and operation of thermal modules and thermal sensors which measure a temperature rise at one or more identified electrical connection points of interest in an electrical power distribution system. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Figure 1:
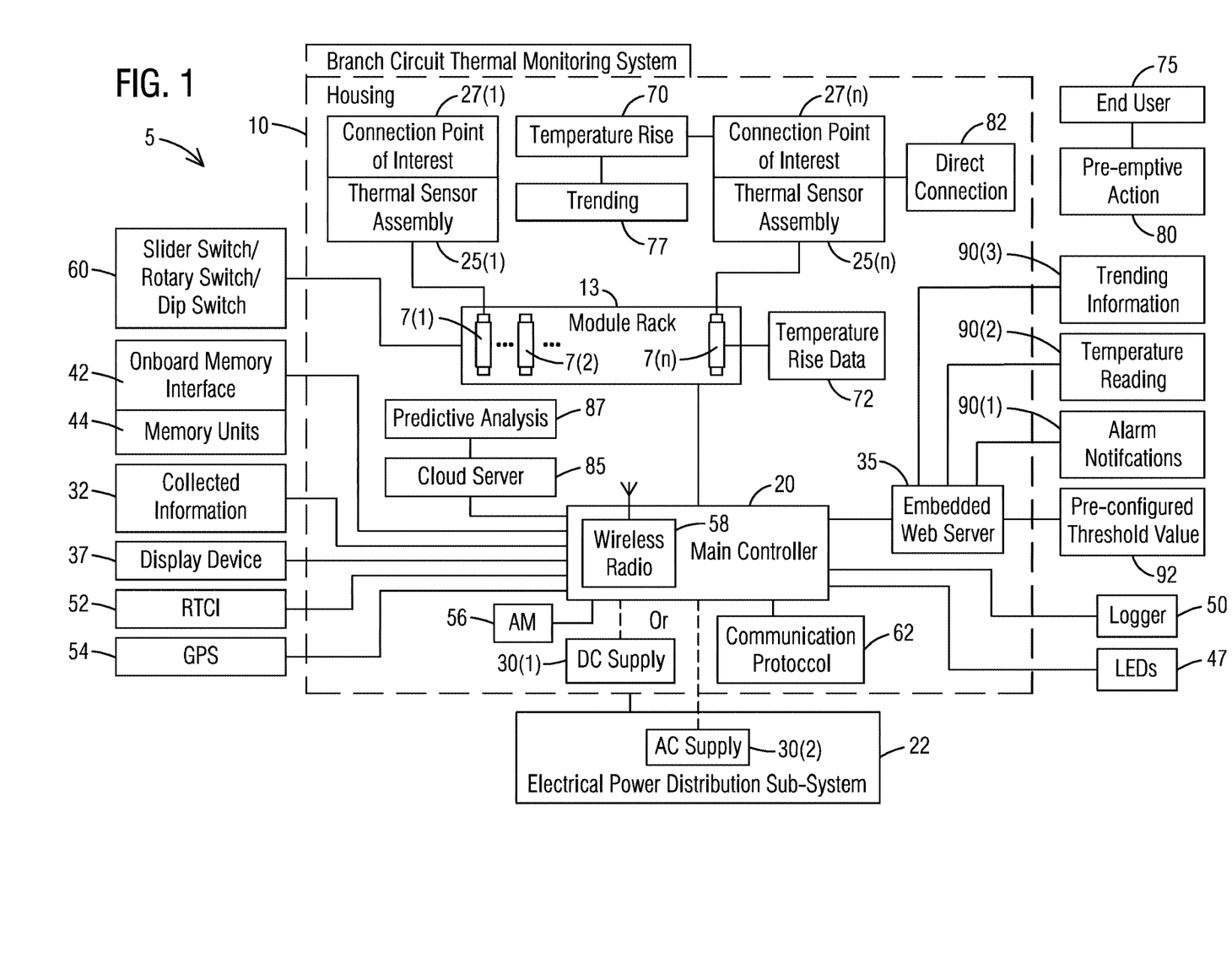
FIG. 1 illustrates a representation of a branch circuit thermal monitoring system for continuous temperature monitoring by directly applied sensors in accordance with an exemplary embodiment of the present invention.

Consistent with one embodiment of the present invention, FIG. 1 represents a representation of a branch circuit thermal monitoring system 5 for continuous temperature monitoring by directly applied sensors. The branch circuit thermal monitoring system 5 includes one or more thermal modules 7(1-$n$) in a temperature sensing and data reporting application in accordance with an exemplary embodiment of the present invention. The thermal modules 7(1-$n$) may be programmable modules.

The branch circuit thermal monitoring system 5 may include a number of discrete components which may be installed separately. The branch circuit thermal monitoring system 5 may include a housing 10 that includes the thermal modules 7(1-$n$). The housing 10 may include a module rack 13. The module rack 13 may be expandable in terms of a number of thermal modules 7 that can be installed together in the system 5. The housing 10 may be integrated with any one of a panel-board, a switchboard, a switch-gear, or a busway panel.

Each of the plurality of thermal modules 7(1-$n$) may be installed on the module rack 13 in a sequential configuration. The housing 10 may include a main controller 20 configured to communicate with the plurality of thermal modules 7(1-$n$) by communicating through a communication network. The module rack 13 may include a slider switch/rotary switch/dip switch 60 for addressing the modules 7(1-$n$).

The branch circuit thermal monitoring system 5 may include an electrical power distribution sub-system 22 coupled to each of the plurality of modules 7(1-$n$). Each of the plurality of thermal modules 7(1-$n$) is connected with an individual thermal sensor assembly such as thermal sensor assemblies 25(1-$n$). The plurality of thermal modules 7(1-$n$) are configured for individually monitoring corresponding identified connection points of interest 27(1-$n$) with the attached plurality of thermal sensor assemblies 25(1-$n$) such that the plurality of thermal modules 7(1-$n$) and the plurality of thermal sensor assemblies 25(1-$n$) provide continuous temperature monitoring of the corresponding identified connection points of interest 27(1-$n$). The thermal sensor assembly 25 is configured to be directly applied to a connection point of interest 27 of the corresponding identified connection points of interest 27(1-$n$) thus avoiding any additional mounting assembly.

The main controller 20 is configured to be powered through a DC electric power supply 30(1) such that the main controller 20 distributes further a required electric power to the each of the plurality of thermal modules 7(1-$n$). The main controller 20 is alternatively configured to be powered directly from an AC electric power supply 30(2) instead of the DC electric power supply 30(1).

The main controller 20 is configured to communicate with the each of the plurality of thermal modules 7(1-$n$) to program the each of the plurality of thermal modules 7(1-$n$) to upgrade their firmware. The main controller 20 is configured to perform a translation of collected information and provide an interface to an external source. The main controller 20 is configured to monitor health of any connected modules of the each of the plurality of thermal modules 7(1-$n$) by periodically performing a self test routine.

The main controller 30 includes an embedded web server 35 accessible by an end customer to perform on-board configuration and review of local data. The embedded web server 35 is a web server which resides in a hardware device and is implemented in the software/firmware of the hardware device. The embedded web server 35 is expected to respond to requests from a client such as Internet web browsers running on computing devices (laptop/pc etc.). The main controller 20 is connected to a display device 37 with a Human Machine Interface (HMI) wherein a user is able to view data, access and review the collected information. The main controller 20 can be configured to provide logging of the collected information 32 on an onboard memory interface 42 and include removable/portable memory units 44 for recording data logs, alarm logs, and system event logs.

The main controller 20 includes a plurality of Light Emitting Diodes (LEDs) 47 to display a current status of the system, a communication status and failure modes. The main controller 20 further includes a logger 50 such as a collected data time stamper to allow an end user to note a time of any events and enable a time synchronization using a Network Time Protocol (NTP). The main controller 20 further includes a real-time clock interface (RTCI) 52 to give software and embedded web pages a real-time clock information for alternate time synchronization. The main controller 20 further includes a Global Positioning System (GPS) device 54 to record a location of the main controller using location synchronization with the GPS device 54 and provide location based system wide topology or hierarchy of information. The main controller 20 further includes an authentication module (AM) 56 which is be used for ensuring encryption and authentication of communication between the main controller 20 and an external network interface. The main controller 20 contains a wireless radio 58 to communicate to portable mobile devices for data access and configuration and uses a communication protocol 62 such as Modbus for communications.

The branch circuit thermal monitoring system 5 is modular and expandable to allow an end user to quickly connect additional thermal modules 7 and additional thermal sensor assemblies 25 to the main controller 20. The branch circuit thermal monitoring system 5 is configured to continuously monitor a temperature rise 70 of the electrical connections 27 of the corresponding identified connection points of interest 27(1-n) thus providing a continuity in temperature rise data 72 recorded or available for an end user 75. The continuous monitored temperature data 72 provides a trending 77 of the temperature rise 70 of the electrical connections 27 of the corresponding identified connection points of interest 27(1-n) to aid in a pre-emptive action 80 on part of the end user 75.

A direct connection 82 to the corresponding identified connection points of interest 27(1-n) where the temperature rise 70 of the electrical connections 27 of the corresponding identified connection points of interest 27(1-n) is to be measured is provided by directly connecting the thermal sensor assembly 25 to an electrical connection 27 of the corresponding identified connection points of interest 27(1-n) to avoid use of an additional assembly housing and an occupied space of the thermal sensor assembly 25. Since the each thermal module 7 of the plurality of thermal modules 7(1-n) and the each thermal sensor assembly 25 of the plurality of thermal sensor assemblies 25(1-n) is configured for monitoring an individual electrical connection 27 of the corresponding identified connection points of interest 27(1-n) there is no post-processing required to identify a precise location of the temperature rise 70 in a collection of electrical connections 27 of the corresponding identified connection points of interest 27(1-n).

Each thermal sensor assembly 25 of the plurality of thermal sensor assemblies 25(1-n) is not operated using batteries thus it reduces an interruption to life of the system 5 as a result of replacement of the batteries. The temperature rise data 72 is reported independently of operation of the electrical power distribution sub-system 22 thereby avoiding any interruption in functionality of each thermal sensor assembly 25 of the plurality of thermal sensor assemblies 25(1-n). The temperature rise data 72 from the system 5 is accessed by an end customer or the end user 75 through a variety of forms either wirelessly or through a wired access in a remote station. The temperature rise data 72 may be transferred to a cloud server 85 to allow additional processing in form of a predictive analysis 87 for aiding in maintenance of electrical components of the system 5.

The system 5 is configured to inform the end user 75 of the temperature rise 70 in a form of alarm notifications 90(1) and user accessible temperature reading 90(2) and trending information 90(3). The main controller 20 is configured to provide the alarm notifications 90(1) the end user 75 when the temperature rise 70 is recorded to exceed a pre-configured threshold value 92.

Figure 2:
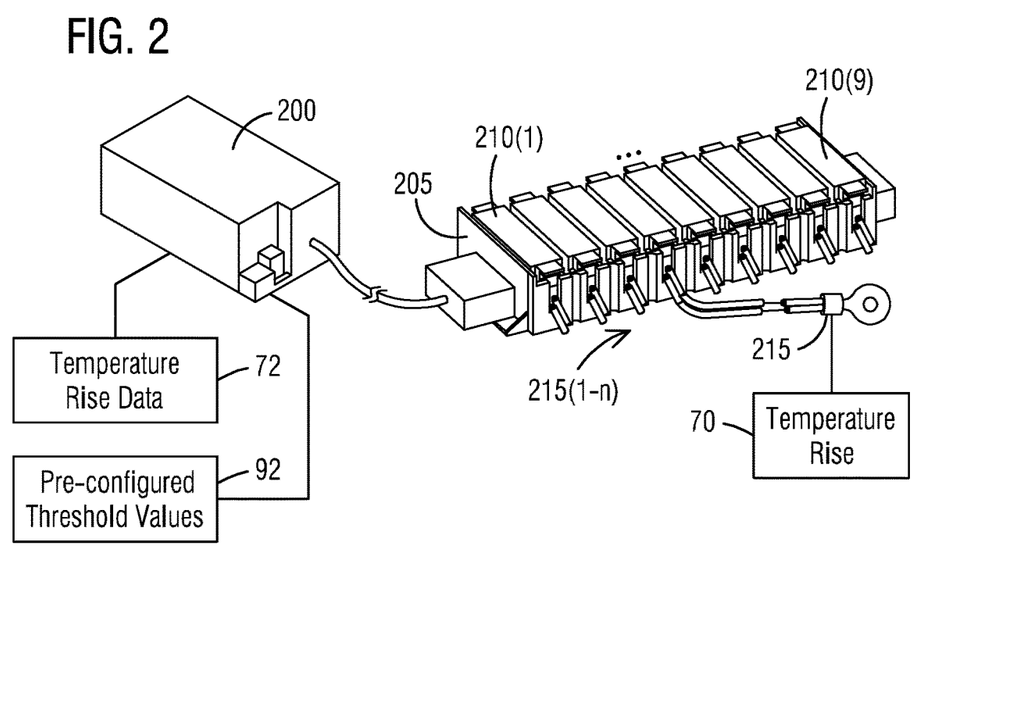
FIG. 2 illustrates a representation of a main controller connected to a module rack including a plurality of thermal modules with associated thermal sensors in accordance with an exemplary embodiment of the present invention.

Referring to FIG. 2, it illustrates a representation of a main controller 200 connected to a module rack 205 including a plurality of thermal modules 210(1-9) with associated thermal sensors or thermal sensing assemblies 215(1-n) in accordance with an exemplary embodiment of the present invention. The main controller 200 provides a method of continuous monitoring of temperature rise in power connection elements such as joints, lugs, cables in an electrical power distribution system such as panel boards, switchboards, switchgear, bus way systems etc. The system 5 (see FIG. 1) allows for a modular and an ease of installation of thermal sensing equipment per need of the customer and provides means to adequately inform the customers/end users of temperature rise in the form of the alarm notifications 90(1) and the user accessible temperature reading 90(2) and the trending information 90(3).

The main controller 200 is capable of communicating to the thermal modules 210(1-9) which are individually monitoring connection points of interest with the attached thermal sensing assemblies 215(1-n). The thermal module 210 and the thermal sensing assembly 215 provide continuous monitoring of the identified connection points (not seen). The thermal sensing assembly 25 and the thermal module 210 are relatively cost effective solutions as they provide a range of mounting options. The number of the thermal module 210 and the thermal sensing assembly 215 requirement can be expanded per a customer's need.

The main controller 200 acts as a collector of the temperature rise data 72 retrieved by the thermal module 210. The main controller 200 is accessible through a remote device through wireless or wired means. The main controller 200 may be configured to provide a user alarm notifications when the temperature rise 70 is recorded to exceed pre-configured threshold values 92. The main controller 200 may also synchronously provide the collection of the temperature rise data 72 to a remote location such as the cloud server 85 (FIG. 1) for further processing.

The main controller 200, the thermal modules 210(1-9) and the thermal sensing assemblies 215(1-n) do not interfere with the normal functioning for the components within the electrical power distribution sub-system 22. Upon the detection of the temperature rise 70, the system 5 (FIG. 1) performs the action of informing the end user without disrupting the power distribution functionality. The system 5 (FIG. 1) may to be housed in a separate cabinet or an enclosure as compared to being within an electrical power distribution system. In another embodiment, the system 5 (FIG. 1) may be installed within the electrical power distribution system.

The thermal sensing assembly 215 is configured to be directly applied to a multitude of connection joint types thus avoiding any additional mounting assembly. A variant of the thermal sensing assembly 215 is also configured to apply as a wire temperature measuring element. These features allow the thermal sensing assembly 215 to be retrofitted to existing power distribution systems.

Figure 3:
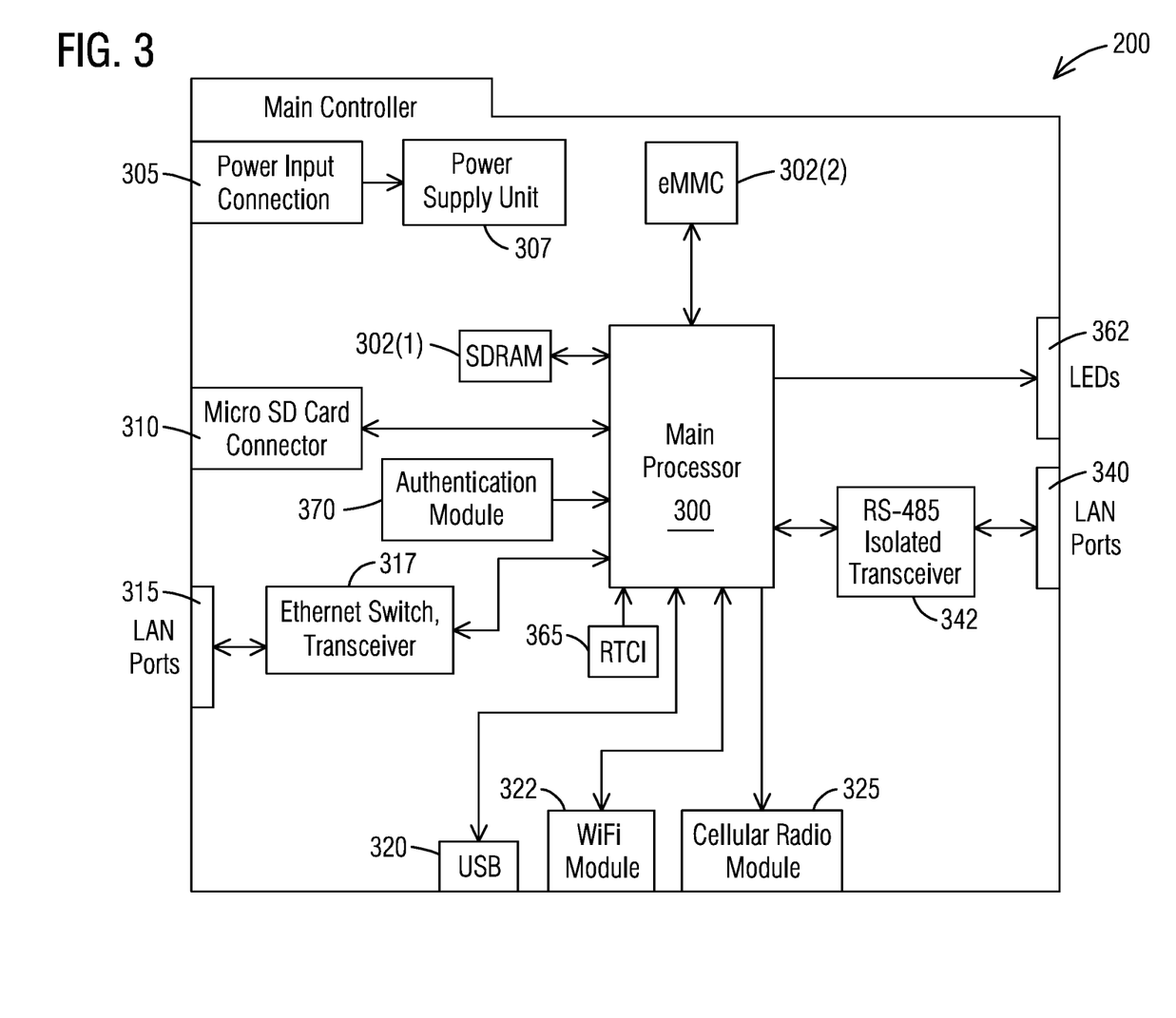
FIG. 3 illustrates details of a main controller in accordance with an exemplary embodiment of the present invention.

Turning now to FIG. 3, it illustrates details of the main controller 200 in accordance with an exemplary embodiment of the present invention. The main controller 200 may include a main processor 300 such as an ARM based processor running an operating system such as embedded Linux OS. For the functioning of such a processor it requires several external peripherals. Examples of the peripherals include a random Access Memory module such as SDRAM 302(1) to perform temporary storage or calculation of information for the main controller 200. Examples of the peripherals include an embedded multimedia card (eMMC) 302(2) to hold non-volatile memory element for the storage of the application software for the main controller 200.

The main controller 200 will also require additional peripherals to perform several functionalities/features as needed. Examples of the additional peripherals include a power input connection 305. Depending on an end application, the main controller 200 may be powered through a power supply unit 307 such as AC or DC power supplies. Examples of the additional peripherals further include a micro SD card connector 310. This micro SD card connector 310 is an external connector interface that allows an external storage/memory unit such as a micro SD card to be inserted to the main controller 200. The main controller 200 may include local area network ports (LAN) ports 315—such as Ethernet ports/RJ45 ports which may be used to allow the main controller 200 to be accessible to the external software and hardware interfaces to allow connectivity via an Ethernet Switch Transceiver 317. The main controller 200 may include a Universal Serial Bus (USB) port interface 320 that allows an external storage/memory unit such as a USB device to be connected to the main controller 200. Additionally the USB port may be utilized to connect other user interface devices such as a keyboard or mouse or allow other USB hosted services such as a USB mounted cellular radio interface as an alternate to an internal cellular radio module 325.

The main controller 200 may include a Wi-Fi module 322. The Wi-Fi module 322 may be a hardware module designed to function as a Wi-Fi control unit to facilitate a Wi-Fi connection with an external Wi-Fi network. The main controller 200 may include the cellular radio module 325. The cellular radio module 325 may be a hardware module designed to function as a cellular radio control unit to facilitate a cellular connection with an external cellular network.

The main controller 200 may include LAN ports 340 for a module connection. Using isolated RS485 transceivers 342, the LAN ports 340 may be used to provide communication between the main controller 200 and associated module rack housing the modules 7(1-n) (FIG. 1) or 210(1-m) (FIG. 2) using the Modbus protocol. The branch circuit thermal monitoring system 5 may use the Modbus protocol which is a serial communication protocol for industrial electronic connected devices. A master device/supervisory control unit communicates with multiple (slave) remote terminal units (RTU) either through a serial hardware interface or through a TCP/IP interface.

The main controller 200 may include LEDs 362 for displaying status information. The main controller 200 may include a real-time clock interface (RTCI) 365. The main controller 200 may include an authentication module (AM) 370.

Figure 4:
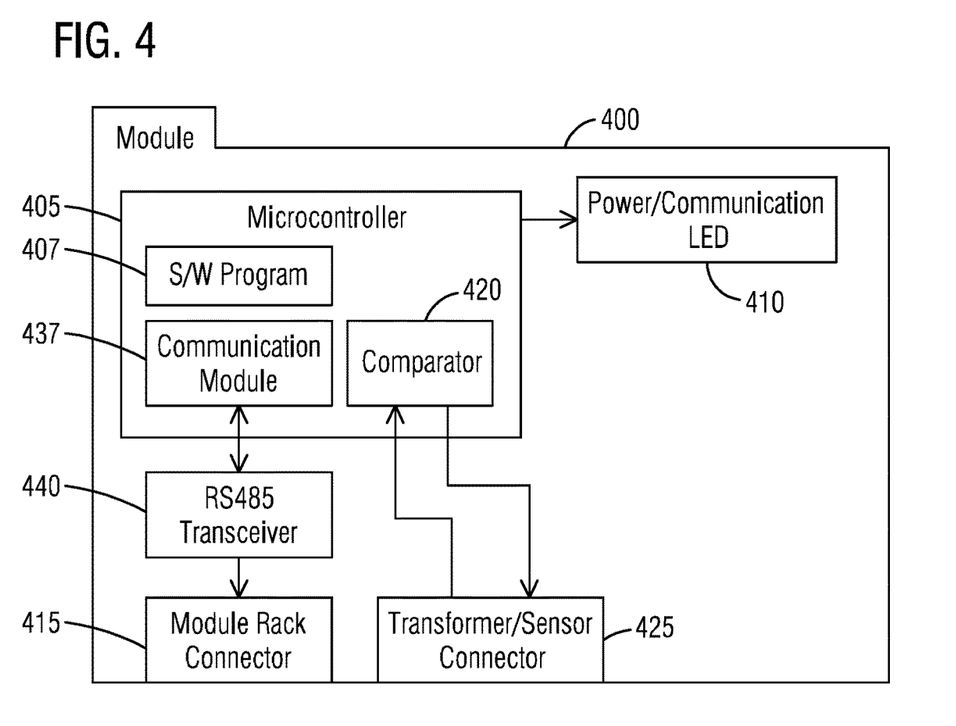
FIG. 4 illustrates details of a thermal module in accordance with an exemplary embodiment of the present invention.

FIG. 4 illustrates details of a programmable and addressable module 400 in accordance with an exemplary embodiment of the present invention. The programmable and addressable module 400 includes a microcontroller 405. The microcontroller 405 serves the purpose of housing a software program 407 to control a power or communication LED 410 indication, contains a software module to handle the communication with a module rack through a module rack connector 415 and through the module rack to an external main controller of the system, contains a software module to handle a comparator block 420 for the input signals received from the transformer/sensor through a transformer/sensor connector 425. The microcontroller 405 includes a communication module 437 that provides a communication capability. The programmable and addressable module 400 further includes a RS485 transceiver 440 being a hardware block that controls the reception and transmission of information through the module rack connector 415.

The techniques described herein can be particularly useful for a module rack type architecture. While particular embodiments are described in terms of the module rack system architecture, the techniques described herein are not limited to the module rack system architecture but can also be used with other communication system architectures—digital or analog, circuits or devices.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A branch circuit thermal monitoring system comprising:
    a housing including:
        a plurality of thermal modules each connected with a thermal sensor assembly of a plurality of thermal sensor assemblies,
        a module rack that is expandable, wherein each of the thermal module of the plurality of thermal modules are installed on the module rack, and
        a main controller configured to communicate with the plurality of thermal modules,
    wherein the plurality of thermal modules are configured for individually monitoring corresponding identified connection points of interest with the attached plurality of thermal sensor assemblies such that the plurality of thermal modules and the plurality of thermal sensor assemblies provide continuous temperature monitoring of the corresponding identified connection points of interest, and
    wherein the thermal sensor assembly is configured to be directly applied to a connection point of interest of the corresponding identified connection points of interest thus avoiding any additional mounting assembly;
    an electrical power distribution sub-system coupled to the each thermal module of the plurality of thermal modules;
    a plurality of Light Emitting Diodes (LEDs) to display a current status of the system, a communication status and failure modes;
    a logger to allow an end user to note a time of any events and enable a time synchronization using a Network Time Protocol (NTP);
    a real-time clock interface to give software and embedded web pages a real time clock information for alternate time synchronization;
    a Global Positioning System (GPS) device to record a location of the main controller using location synchronization with the GPS device and provide location based system wide topology or hierarchy of information; and
    an authentication chip which is be used for ensuring encryption and authentication of communication between the main controller and an external network interface.

2. The system of claim 1, wherein the housing is integrated with any one of a panel-board, a switchboard, a switchgear, or a busway panel.

3. The system of claim 1, wherein the system is modular and expandable to allow an end user to quickly connect additional thermal modules and additional thermal sensor assemblies to the main controller.

4. The system of claim 1, wherein the system is configured to continuously monitor a temperature rise of electrical connections of the corresponding identified connection points of interest thus providing a continuity in temperature rise data recorded or available for an end user.

5. The system of claim 1, wherein any continuous monitored temperature data provides a trending of a temperature rise of electrical connections of the corresponding identified connection points of interest to aid in any pre-emptive action on part of the end user.

6. The system of claim 1, wherein a direct connection to the corresponding identified connection points of interest where a temperature rise of electrical connections of the corresponding identified connection points of interest is to be measured is provided by directly connecting the thermal sensor assembly to an electrical connection of the corresponding identified connection points of interest to avoid use of an additional assembly housing and an occupied space of the thermal sensor assembly.

7. The system of claim 1, wherein since the each thermal module of the plurality of thermal modules and the each thermal sensor assembly of the plurality of thermal sensor assemblies is configured for monitoring an individual electrical connection of the corresponding identified connection points of interest there is no post-processing required to identify a precise location of a temperature rise in a collection of electrical connections of the corresponding identified connection points of interest.

8. The system of claim 1, wherein the each thermal sensor assembly of the plurality of thermal sensor assemblies is not operated using batteries thus reduces an interruption to life of the system as a result of replacement of the batteries.

9. The system of claim 1, wherein temperature rise data is reported independently of operation of the electrical power distribution sub-system thereby avoiding any interruption in functionality of the each thermal sensor assembly of the plurality of thermal sensor assemblies.

10. The system of claim 1, wherein temperature rise data from the system is accessed by an end customer through a variety of forms either wirelessly or through a wired access in a remote station.

11. The system of claim 1, wherein temperature rise data is transferred to a cloud server to allow additional processing in form of a predictive analysis for aiding in maintenance of electrical components of the system.

12. The system of claim 1, wherein the system is configured to inform an end user of a temperature rise in a form of alarm notifications and user accessible temperature reading and trending information.

13. The system of claim 1, wherein the main controller is configured to provide one or more alarm notifications to an end user when a temperature rise is recorded to exceed a pre-configured threshold value.

14. The system of claim 1, wherein the main controller is configured to act as a translator or a gateway function wherein data recorded from one or more thermal modules of the plurality of thermal modules is translated to other widely used industry protocols.

15. The system of claim 1, wherein the main controller includes an embedded web server accessible by an end customer to perform on-board configuration and review of local data.

16. The system of claim 1, wherein the main controller is connected to a display device with a Human Machine Interface (HMI) wherein a user is able to view data, access and review collected information.

17. The system of claim 1, wherein the main controller is connected to auxiliary responsive devices including audible support systems or alarm devices for providing system alerts conditions or immediate responses based on temperature rise data.

18. The system of claim 1, wherein the main controller contains a wireless radio to communicate to portable mobile devices for data access and configuration.

19. The system of claim 1, wherein the main controller to provide logging of collected information on an onboard memory interface and include removable/portable memory units for recording data logs, alarm logs, and system event logs.

20. A branch circuit thermal monitoring system comprising:
   a housing including:
      a plurality of thermal modules each connected with a thermal sensor assembly of a plurality of thermal sensor assemblies,
      a module rack that is expandable, wherein each of the thermal module of the plurality of thermal modules are installed on the module rack, and
      a main controller configured to communicate with the plurality of thermal modules,
   wherein the plurality of thermal modules are configured for individually monitoring corresponding identified connection points of interest with the attached plurality of thermal sensor assemblies such that the plurality of thermal modules and the plurality of thermal sensor assemblies provide continuous temperature monitoring of the corresponding identified connection points of interest, and
   wherein the thermal sensor assembly is configured to be directly applied to a connection point of interest of the corresponding identified connection points of interest thus avoiding any additional mounting assembly;
   an electrical power distribution sub-system coupled to the each thermal module of the plurality of thermal modules;
   a logger to allow an end user to note a time of any events and enable a time synchronization using a Network Time Protocol (NTP); and
   a real-time clock interface to give software and embedded web pages a real time clock information for alternate time synchronization.

21. A branch circuit thermal monitoring system comprising:
   a housing including:
      a plurality of thermal modules each connected with a thermal sensor assembly of a plurality of thermal sensor assemblies,
      a module rack that is expandable, wherein each of the thermal module of the plurality of thermal modules are installed on the module rack, and
      a main controller configured to communicate with the plurality of thermal modules,
   wherein the plurality of thermal modules are configured for individually monitoring corresponding identified connection points of interest with the attached plurality of thermal sensor assemblies such that the plurality of thermal modules and the plurality of thermal sensor assemblies provide continuous temperature monitoring of the corresponding identified connection points of interest, and
   wherein the thermal sensor assembly is configured to be directly applied to a connection point of interest of the corresponding identified connection points of interest thus avoiding any additional mounting assembly;
   an electrical power distribution sub-system coupled to the each thermal module of the plurality of thermal modules;
   a Global Positioning System (GPS) device to record a location of the main controller using location synchronization with the GPS device and provide location based system wide topology or hierarchy of information; and
   an authentication chip which is be used for ensuring encryption and authentication of communication between the main controller and an external network interface.

* * * * *